(12) United States Patent
Sampath et al.

(10) Patent No.: US 6,665,425 B1
(45) Date of Patent: Dec. 16, 2003

(54) SYSTEMS AND METHODS FOR AUTOMATED IMAGE QUALITY BASED DIAGNOSTICS AND REMEDIATION OF DOCUMENT PROCESSING SYSTEMS

(75) Inventors: Meera Sampath, Penfield, NY (US); Stephen J. Nichols, Walworth, NY (US); Elizabeth A. Richenderfer, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/464,596

(22) Filed: Dec. 16, 1999

(51) Int. Cl.[7] .................................................. G06K 9/00

(52) U.S. Cl. ...................................... 382/112; 358/1.15

(58) Field of Search ...................... 382/112; 700/79–82; 399/8, 9, 15, 18–20; 714/25, 30; 358/1.15

(56) References Cited

U.S. PATENT DOCUMENTS

| | | |
|---|---|---|
| 4,071,911 A | 1/1978 | Mazur |
| 4,086,434 A | 4/1978 | Bocchi |
| 4,583,834 A | 4/1986 | Seko et al. |

(List continued on next page.)

FOREIGN PATENT DOCUMENTS

| | | |
|---|---|---|
| EP | 0 617 696 A1 | 9/1995 |
| EP | 0 854 632 | 7/1998 |
| EP | 0 895 399 A1 | 2/1999 |

OTHER PUBLICATIONS

"Remote Diagnostics Systems," Paul F. Morgan, Xerox Disclosure Journal, vol. 3, No. 3, May/Jun. 1978, pp. 191–192.

"Real Time Fault Monitoring of Industrial Processes," Chapter 4.2.2—Event–based architecture for real–time fault diagnosis, A. D. Pouliezos et al., Kluwer Academic Publishers, 1994, pp. 284–287.

"Fault Diagnosis in Dynamic Systems Using Analytical and Knowledge–based Redundancy—A Survey and Some New Resluts," Paul M. Frank, Automatica, vol. 26, 90 International Federation of Automatic Control, 1990, pp. 459–474.

(List continued on next page.)

Primary Examiner—Amelia M. Au
Assistant Examiner—Martin Miller
(74) Attorney, Agent, or Firm—Oliff & Berridge, PLC

(57) ABSTRACT

During the operation of a document processing system machine and job data are collected from a document processing system. Optionally, machine information, both for the specific machine and population based data are acquired from a database or server. Having accumulated the job data and machine data, the diagnostic inference engine performs an analysis to determine the initial diagnosis of the document processing system. After obtaining the initial diagnosis, the system determines the test patterns to be printed and the image quality tests to be performed. The system then prints test patterns, and scans the patterns to determine image quality parameters and/or to automatically identify image defects. Optionally, image defect information may also be provided by the customer or the service engineer via a user interface. Next, a diagnostic inference engine uses the results of the image quality analysis to refine the initial diagnosis. Then, the diagnostic results are output, stored, and optionally displayed to, for example a customer or a customer service engineer. Based on the diagnostic results, and if problems are found, the machine enters a repair sequence. In particular, the machine can request either a customer or a customer service engineer repair action, or, alternatively, enter an auto-correction or an auto-calibration mode to repair itself. Upon completion of one or more, or any combination, of these repair actions, the machine verifies its operation and again checks to ensure the repairs have been completed successfully.

40 Claims, 7 Drawing Sheets

U.S. PATENT DOCUMENTS

| | | |
|---|---|---|
| 5,038,319 A | 8/1991 | Carter et al. |
| 5,057,866 A | 10/1991 | Hill, Jr. et al. |
| 5,084,875 A | 1/1992 | Weinberger et al. |
| 5,365,310 A | 11/1994 | Jenkins et al. |
| 5,510,876 A | 4/1996 | Hayashi et al. |
| 5,510,896 A | 4/1996 | Wafler |
| 5,515,503 A | 5/1996 | Shimomura et al. ... 395/183.02 |
| 5,580,177 A | 12/1996 | Gase et al. |
| 5,612,902 A | 3/1997 | Stokes |
| 5,619,307 A | 4/1997 | Machino et al. |
| 5,642,202 A | 6/1997 | Williams et al. |
| 5,680,541 A | 10/1997 | Kurosu et al. |
| 5,694,528 A | 12/1997 | Hube |
| 5,727,135 A | 3/1998 | Webb et al. |
| 5,748,221 A | 5/1998 | Castelli et al. |
| 5,761,505 A | 6/1998 | Golson et al. |
| 5,786,994 A | 7/1998 | Friz et al. |
| 5,884,118 A | 3/1999 | Mestha et al. |
| 5,887,216 A * | 3/1999 | Motoyama ..................... 399/8 |
| 5,892,451 A | 4/1999 | May et al. |
| 5,893,083 A | 4/1999 | Eshghi et al. |
| 6,023,525 A | 2/2000 | Cass |
| 6,023,595 A | 2/2000 | Suzuki et al. |

OTHER PUBLICATIONS

"Combining Expert System and Analytical Redundancy Concepts for Fault–Tolerant Flight Control," David A. Handelman et al., Princeton University, J. Guidance, vol. 12, No. 1, Jan.–Feb. 1989, pp. 39–45.

"The Seybold Report on Publishing Systems", *Report from On Demand: Digital Printing & Publishing*, vol. 27, No. 17, p. 23.

"IQ Data Systems—revolutionizing the way . . . is measured, monitored, and controlled.", IQ Data Systems, http://www.iqds.com/IQDS/Products/Technology.cfm, 1999.

* cited by examiner

SYSTEMS AND METHODS FOR AUTOMATED IMAGE QUALITY BASED DIAGNOSTICS AND REMEDIATION OF DOCUMENT PROCESSING SYSTEMS

BACKGROUND OF THE INVENTION

1. Field of Invention

This invention relates to failure diagnosis, prediction and remediation of document processing systems based on an image quality defect analysis.

2. Description of Related Art

It is well known that customer satisfaction can be improved and maintenance costs reduced if problems with copiers and printers can be fixed before they become serious enough to warrant a service call by the customer. Systems exist that enable printers and copiers to call for service automatically when sensors detect certain operating parameters outside of permissible ranges. Generally, these systems take effect after a threshold has been reached where the degradation in image quality is directly observable by the customer. For example, given the large number of operating parameters that need to be tracked during operation, a given parameter at a certain value may or may not be a problem depending on the cumulative values of the other parameters in the system. Additionally, systems exist that attempt to diagnose failures in document processing systems based on image quality analysis of the print. Systems exist for image quality based diagnosis of copiers over telephone lines such as U.S. Pat. No. 5,365,310, incorporated herein by reference in its entirety.

SUMMARY OF THE INVENTION

The systems and methods of this invention provide for automated diagnosis, prediction and remediation of failures in document processing systems based on an image quality defect analysis in conjunction with a machine/device data analysis. Specifically, the systems and methods of this invention automatically identify image quality problems in document processing systems, such as analog and digital copiers, printers, scanners, facsimiles, and the like based on all direct and indirect marking technologies including xerography, inkjet, liquid ink, lithography, or the like, by analyzing specific test patterns via techniques such as image processing and pattern recognition.

Secondly, the systems and methods of this invention, in a diagnostic expert system, automatically diagnose and/or predict machine failures based on the combined results of the image quality analysis and machine data analysis. Thirdly, this invention separately provides systems and methods for determining and executing an appropriate action based on the results of the diagnostic/prediction analysis. Such actions could include, for example, guiding the customer through a repair procedure, automatic scheduling of service, parts and/or consumables and automated remediation of faults, for example, as discussed in copending application Ser. No. 09/464,597, filed herewith and incorporated herein by reference in its entirety.

Additionally, this invention separately provides systems and methods for the presentation of the results of the failure prediction, diagnosis or remediation, locally, or, remotely, such as, for example, on a computer user interface, via e-mail, via a web page, via a paging service or cellular phone, or the like, and for the storage of the results, for example, in one or more databases, servers, or device history logs. Therefore, the systems and methods of this invention are capable of performing intelligent self-diagnosis, correction and notification of problems that lead to image quality defects.

The systems and methods of this invention provide a diagnostic/prognostic analysis device for document processing systems.

This invention separately provides systems and methods for identifying image quality defects.

This invention also separately provides systems and methods for automatically diagnosing and/or predicting machine failures based on a combined analysis of image quality data and device data. This invention additionally provides systems and methods that provide a unified framework to incorporate a variety of different diagnostic technologies.

This invention separately provides systems and methods for determining an appropriate action based on the results of the diagnostic/prognostic analysis.

This invention separately provides systems and methods that allow an automatic scheduling of service, parts and/or consumables to be provided to an electronic system.

This invention separately provides systems and methods that guide a customer through a repair procedure.

This invention separately provides systems and methods that allow an automated remediation of faults, either completely or partially, and with or without human intervention.

This invention separately provides systems and methods for the presentation of the results of the failure prediction, diagnosis or remediation either locally or remotely.

The invention separately provides systems and methods that allow electronic systems to be interrogated and controlled remotely over a network for the acquisition of data for use in failure prediction, diagnosis and/or remediation.

This invention additionally provides systems and methods for pooling data related to a plurality of document processing systems to accomplish failure prediction, diagnosis and remediation of the distributed electronic systems.

Specifically, at any point during the operation of a document processing system, the diagnostic/prognostic systems and methods of this invention can be invoked. At this time, machine and job data are collected from the document processing system. The machine information can be obtained from the machine that is being diagnosed and/or from one or more knowledge servers or databases that contain machine specific information as well as population information from a fleet of similar machines via a network connection. Having accumulated the job data and machine data, the diagnostic inference engine performs an analysis to determine the initial diagnosis of the document processing system. After obtaining the initial diagnosis, the system determines the test patterns to be analyzed and the image quality tests to be run. Then, system prints test patterns, and scans the patterns to identify image quality defects. Next, a diagnostic inference engine analyzes the image defects in the printed test patterns to refine the initial diagnosis. Then, the diagnostic results are output, and optionally displayed to, for example, a customer or customer service engineer.

Based on the diagnostic results, the machine enters a repair sequence if problems are found. In particular, the machine can request either a customer or a customer service engineer repair action, or, alternatively, enter an auto-correction or auto-calibration mode to repair itself. Upon completion of one or more, or any combination, of these repair actions, the machine verifies its operation and again checks to ensure the repairs have been completed successfully.

It is to be noted that at any time during the diagnostic or remediation process, additional data can be obtained from the machine by interrogating or controlling the machine and/or requesting additional test patterns be printed, scanned and analyzed.

These and other features and advantages of this invention are described in or are apparent from the following detailed description of the preferred embodiments.

BRIEF DESCRIPTION OF THE DRAWINGS

The preferred embodiments of the invention will be described in detail, with reference to the following figures, wherein.

DETAILED DESCRIPTION OF PREFERRED EMBODIMENTS

Figure 1:
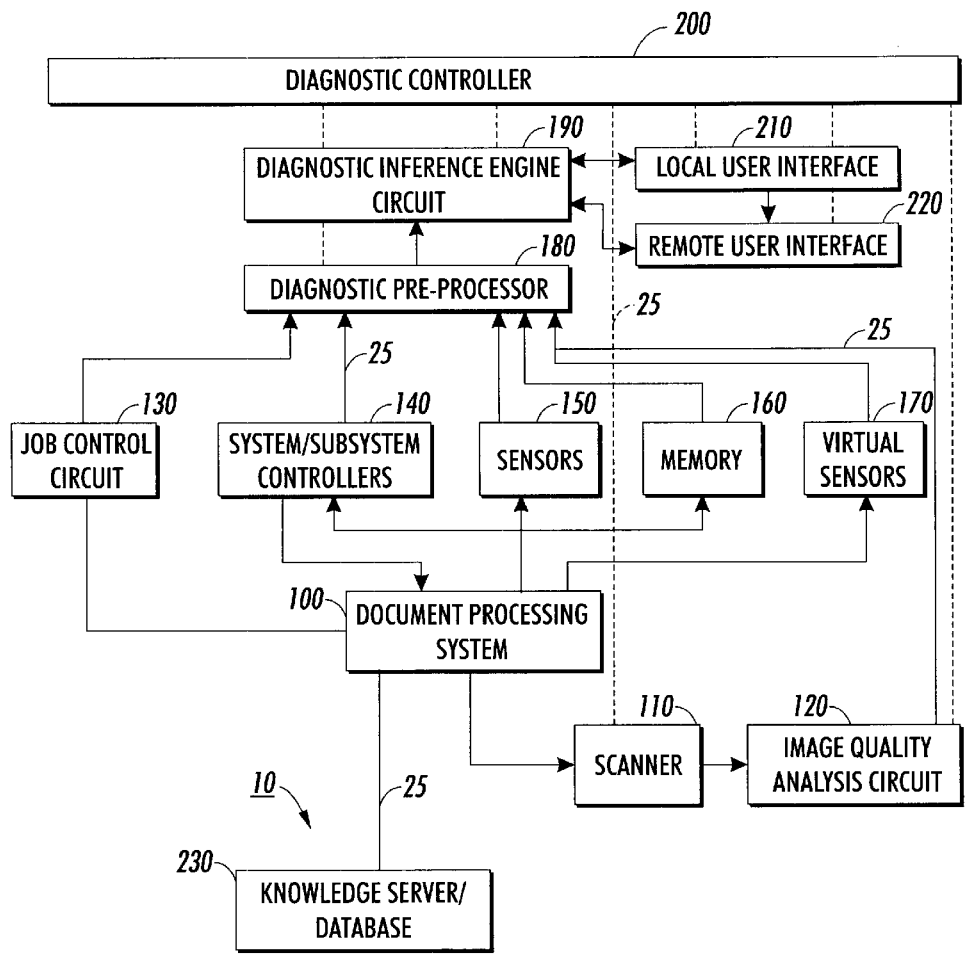
FIG. 1 is a functional block diagram illustrating a first embodiment of the diagnostic system according to this invention.

In a document processing system, such as a printer, copier, scanner, facsimile machine, or a multifunction device incorporating one or more of the above, when the user is not satisfied with the machine's performance, or when preventative maintenance is desired, the diagnostic systems of this invention are invoked. In particular, the diagnosis routine can be initiated by the machine itself or can be initiated by a user or other operator, or by a diagnostic server residing on a distributed network. The first step to diagnosing/predicting a system problem is to collect and analyze relevant machine data. Such data includes, but is not limited to, control data such as commands issued by system and subsystem controllers, scheduling and timing data, set-point and actuator data, sensor data, state estimate data and so on; diagnostic data such as fault counts, error counts, event counts, warning and interlock counts, calibration data, device set-up data, high frequency service item information, service history data, machine history data and so on, virtual sensor readings, or job related data such as copy counts, percentage area coverage, document size and type and the like. The data could also include environmental conditions such as temperature and humidity of the operating environment, and machine usage information such as, for example, the type and frequency of machine usage, and machine configuration information. This data collection can occur in real time, for example, as the user is processing documents, or, during a special diagnostic "stress mode" or test mode, where the document processing system is exercised appropriately to extract useful diagnostic information that may otherwise be unavailable in the normal machine operation mode.

Alternatively, the data collection can occur on an ongoing basis before service of the machine is attempted, or even when the machine is in a limp-along mode. The information may be obtained from the machine itself, or from one or more servers connected to the machine in a distributed network that store information pertinent to the machine being diagnosed. In addition to the machine specific information, fleet-wide machine data resident in population databases or servers may also be used in the diagnostic/prognostic analysis. This data is then forwarded to a diagnostic inference engine that analyzes the data and provides an initial diagnosis. If this diagnosis proves to be incomplete, the image quality analysis module is activated. Then, based on the results of the initial diagnosis, a determination is made as to what test prints are to be scanned and what image quality tests are to be performed. A set of pre-defined test patterns are then printed and subsequently scanned, or scanned directly, depending on whether the test patterns are stored internal to the machine being diagnosed, are available on a networked drive, or, are available in hardcopy form. This scanning can be accomplished by using an external scanner, or by using a scanner incorporated into the document processing system. Furthermore, the scanning process can be user mediated, or can be completely automated if the device includes a media transport mechanism to re-circulate a document to the device's scan path from the output path, such as, for example, from the output of the fuser module in a printer. The directly scanned image, or the printed and subsequently scanned image, is then analyzed by the image quality analysis module to detect and identify the presence of defects in the image and to determine image quality parameters. The results of the image quality/defect analysis are then fed to the diagnostic engine which refines its original diagnosis based on the new information received from the printed test pattern(s), and produces a final list of failures, suspected failures, or impending failures. By collecting and analyzing the machine data first, and using the results of that analysis to direct the extent and content of the image quality analysis, the number of test patterns that need to be created and hence, the amount of time spent by the customer, a customer service engineer, a third party repair person or an autonomous repair agent in diagnosing and servicing the machine can be reduced. The machine data analysis and image quality analysis can take place in any order, or even in parallel, depending on the specific system implementation. Furthermore, at any time during the diagnostic process, the machine may be queried or controlled to obtain additional data from the machine such as, for example, by running additional tests. Likewise, additional test patterns may also be printed, scanned and analyzed at any time during the process, if necessary. Additionally, the extent of the diagnosis process can limited, for example, based on a predefined user authorization scheme and corresponding user identification.

The results from the diagnostic engine are then conveyed to, for example, the customer or the customer service engineer. Where possible, the system attempts to repair itself. Otherwise, either the customer or a service engineer is contacted to undertake the appropriate repair action. In addition, a request could be forwarded automatically to a parts/consumables supplier. Once the machine has been repaired, a verification process is initiated to ensure the repairs were successful. Finally, the results of the diagnostic/prognostic analysis and the repair procedures are logged into a machine service log or one or more databases.

FIG. 1 illustrates one exemplary embodiment of the diagnostic system 10. The diagnostic system 10 comprises a document processing system 100, such as a xerographic marking engine, an ink jet printer, a lithographic printer, a color or black and white printer, a color or black and white photocopier, a color or black and white scanner, a facsimile machine, or the like, a scanner 110, an image quality analysis circuit 120, a job control circuit 130, a system/subsystem controller(s) 140, one or more sensors 150, a memory 160, one or more virtual sensors 170, a diagnostic pre-processor circuit 180, a diagnostic inference engine circuit 190, a diagnostic controller 200, a knowledge server/database 230, a local user interface 210 and a remote user interface 220, all interconnected by links 25.

It is to be appreciated that any one of, or a portion of the components of the diagnostic system can be located anywhere including on the actual document processing system itself, on a distributed network, or a collocated or remote diagnostics location.

Furthermore, the links 25 can be wired or wireless links or any other known or later developed element(s) that is capable of supplying electronic data to and from the connected elements. Furthermore, links 25 can be any one of, or combination of, a direct serial connection, a distributed network such as an intranet, a local area network, a metropolitan area network, a wide area network, a satellite communication network, an infrared communication network, the Internet, or the like.

Since sensors are typically a scarce commodity in document processing systems, in order to diagnose machine failures down to the individual component, an easily replaceable unit, or a customer replaceable unit, typically more machine information than that provided by the on-board sensors is necessary. To this end, the virtual sensor is used to augment the information provided by the real sensors on the machine. The virtual sensors 170 are based on quantitative analysis of machine signals, such as, for example, ground return line currents, in order to extract useful diagnostic information from the signals. Alternatively, they could be counters that keep track of signal changes, fault counts, calibration runs, pages processed, etc. Depending on the document processing system, the nature of the failures to be diagnosed, and the nature of the available information, a variety of different techniques of varying complexity can be used for the virtual sensors 170. Such techniques, such as those described in U.S. application Ser. No. 60/154,016, incorporated herein by reference in its entirety, include but are not limited to, threshold analysis, statistical analysis, such as means and variance analysis, signature analysis, pattern analysis, trend analysis, event sequence analysis, timing analysis, rate analysis, counting mechanisms, such as, for example, signal change counters, state estimation analysis, and the like.

In operation, data is collected from one or more of the job control circuit 130, the system/subsystem controllers 140, the one or more sensors 150, the one or more virtual sensors 170, and the memory 160. This data is derived from the operational characteristics of the document processing system 100 and forwarded to the diagnostic pre-processing circuit 180. In addition, both the individual machine information and the fleet-wide population statistics may be obtained from the knowledge server/database 230. The pre-processing circuit 180 collects the machine and job data from the various sensors, controllers, or the like, and translates this data into a format recognizable by the diagnostic inference engine circuit 190. For example, this pre-processing may involve discretization of analog data received from one or more sensors into qualitative values. Alternatively, it may involve translating machine signals into discrete event sequences as described in U.S. Application No. 60/154,016, that can be recognized by the diagnostic inference engine circuit 190.

The diagnostic inference engine circuit 190 performs the task of reasoning with the multiple sources of diagnostic/prognostic information and isolating the root of the cause for the failure, actual or impending. The diagnostic inference engine circuit 190 can be based on one or more of the following diagnostic/prognostic technologies, for example, model based diagnosis, discrete event systems diagnosis, bayesian networks, causal networks, neural networks, artificial intelligence, rule-based systems, expert systems, fuzzy logic analysis, and/or look-up tables. Therefore, based on the analysis of the data output by the pre-processor circuit 180, the diagnostic inference engine circuit 190 determines the list of components that have failed, are suspected to have failed or estimated to fail.

The diagnostic inference engine circuit 190 then determines an initial diagnosis of the document processing system 100 based on the data received from the various sensors, the virtual sensors, the controllers, and the memory units via the pre-processor circuit 180. Based on this initial diagnosis, and in cooperation with the diagnostic controller 200, the initial diagnosis is forwarded to one or more of the local user interface 210 or the remote user interface 220, and displayed. Additionally, the diagnostic controller 200 initiates a print and scan sequence to determine image quality parameters and/or detect image defects. In particular, the diagnostic controller decides, based on the initial diagnosis, what test prints are to be scanned and what image quality parameters are to be determined and/or what defects are to be recognized and characterized. The document processing system 100 is then be directed to produce one or more test pattern prints, stored either in its internal memory, or on a network drive in a distributed network environment. The test pattern prints are then forwarded to the scanner 110 for digitizing. Alternately, the customer, the customer service engineer, or the like, can directly scan the hard copy test prints.

It is to be appreciated that the scanner 110 can be collocated with the document processing system 100 or, alternatively, be a stand-alone device or incorporated into, for example, a dedicated scanner and diagnostic system. Also, the printing and scanning process can be completely automated if a transport mechanism is available to re-circulate the printed test pattern to the scanner, for example, in the case where the scanner is incorporated into the document processing system being diagnosed.

The digitized images of the test patterns produced by scanner 110 are forwarded to the image quality analysis circuit 120. The image quality analysis circuit 120 analyzes the image, using commonly known image processing techniques such as, for example, Fourier transform analysis, histogramming, edge detection, 1-D projections, segmentation, classification, artifact detection, FIR filtering, morphological analysis, wavelet analysis and statistical analysis pattern recognition techniques, neural networks, or the like, to evaluate image quality parameters and/or identify defects in the image(s). Furthermore, the image processing can compensate via a calibration circuit for any defects introduced by the scanner., and then determine the image quality parameters and/or detect the presence of any defects in the printed document.

Specifically, the image quality defect recognition circuit 120 detects the presence of one or more of a set of pre-defined defects in the input scanned image and/or calculates the values of one or more image quality parameters. Such defects and parameters include, but are not limited to, lines, bands, streaks, spots, mottle, halo, splatter, light images, dark images, blank images, deletions, background ink contamination, graininess, ghosting, skew, registration defects, color balance, color registration, color variation within a page, print-to-print variation, inboard-outboard variation, loss of a tone-reproduction, line width, edge width, line density, line edge, line shape, sharpness, contours, reload, pixel to pixel placement defects, and the like. In particular, the image quality analysis and defect recognition are accomplished through the use of image processing and/or pattern recognition algorithms such as those described in copending applications Ser. Nos. 09/450, 185; 09/450,183; 09/450,182; 09/450,181; 09/450,180; and 19/450,177, incorporated herein by reference in their entirety.

In addition to the image processing algorithms, the image quality defect recognition 120 may also have an optical character recognition component, bar code or glyph recognition component that ensures that the correct test patterns have been scanned and scanned in the right sequence and orientation. If the correct test pattern was not scanned, in cooperation with the diagnostic controller 200, the user can be redirected to reprint and re-scan the right prints.

Then, upon completion of the image quality defect analysis, the image quality defect recognition circuit 120 outputs a set of metrics that qualify and quantify the one or more defects, and/or image quality parameters. In addition to automated recognition of the image quality defects, input may also be obtained from the customer, and/or the customer service engineer via the user interface 210 or 220, for characterizing the defects observed either in the test prints, or in the customer prints. This additional input from the user can be used to augment and/or verify the results of the image quality analysis module, and/or to reduce the number of test prints to be scanned and the number of defects to be characterized, similar to the manner in which the results of the initial diagnosis based on machine data are used.

The results of the defect recognition are forwarded to the diagnostic pre-processor 180, via link 25. The pre-processing in this case may involve comparisons of the results of the image quality analysis from two or more scanned images to check, for example, the presence of defects in all prints, the registration of a defect with respect to a page, the effects of rotating/magnifying a test pattern, and so on. The pre-processor circuit 180, now having information pertaining to the image quality, forwards this additional information to the diagnostic inference engine circuit 190. The diagnostic inference engine circuit 190 then refines the initial diagnosis and outputs the results of this diagnosis to one or more of the local user interface 210 and/or the remote user interface 220. For example, the diagnostic inference engine circuit 190 can forward to either one of the user interfaces information indicating that the machine is operating acceptably, or that one or more failures are predicted to occur, or have occurred.

The diagnostic inference engine circuit 190 outputs information pertaining to the operational status of the document processing system. In particular, the list includes, but is not limited to, status information about the system, a list of one or more failed components, information pertaining to components that are predicted to fail, or the like. These results are output and displayed locally on the user interface of the system and/or a local diagnostic server on the customer side and/or transmitted remotely to any entity needing the information, such as a customer service engineer, a diagnostic server, a part supplier, or the like. Additionally, it is to be appreciated that the results of the diagnostic inference engine circuit 190 need not be limited to visual notifications, but can also include audio notifications or any means obvious to one of ordinary skill in the art to notify the appropriate party. Examples of such notification methods include notifications via e-mail, paging, cellular phones, a web page, or the like. Finally, the results of the diagnostic/prognostic analysis may also be stored in machine history logs and/or in one or more databases or servers.

If the machine is operating correctly, the diagnostic routine is complete. However, if there are any errors, or predicted errors determined in the refined diagnosis step, the diagnostic system 10 performs one or more of contacting a customer or customer service engineer for commencement of repair action. Alternatively, the diagnostic system 10 communicates with the document processing system 100 to invoke any appropriate auto-repair procedure such as machine set-up procedures, color balancing, color calibration, placing the machine in a low productivity mode, etc. The results of the automated repair procedures, such as, for example, the machine parameters changed during a set-up procedure, are displayed on the user interface of the system, and/or a diagnostic server and/or transmitted remotely to a customer service engineer and, in addition, stored in the machine history logs. Upon completion of the customer or customer service engineer repair action, and/or an automatic repair sequence, the machine's operation is verified and, if correct, the diagnostic routine completed. In the case of customer repair, the customer is guided through a repair procedure. In addition, the system may be equipped with a security system that allows different classes of customers, such as the end-user, key operator, and system administrator different levels of access to perform repair actions. For example, the end-user may have access to replace consumables, but no access to run a color calibration routine, or adjust machine setpoints. The key operator may have access to run a calibration routine and replace consumables, but denied access to change set-point values in the systems internal memory. All users may on the other hand, have permissions to place a service call It is to be noted that in the above embodiment the machine data analysis precedes the image quality analysis. However, the machine data analysis and the image quality analysis can take place in any order, or even in parallel, depending on the specific system implementation. It is to also to be noted that at any time during the diagnostic process, the machine may be queried or controlled to obtain additional data from the machine such as, for example, by running additional tests. Likewise, additional test patterns may also be scanned and analyzed at any time during the process if necessary.

FIGS. 2–7 illustrate various exemplary embodiments of the locations of the components of the diagnostic/prognostic system 10 based on various considerations such as cost, network bandwidth, processor requirements, memory requirements, latency, data transmission rates, firewall and security issues, marketing considerations, or the like.

Figure 2:
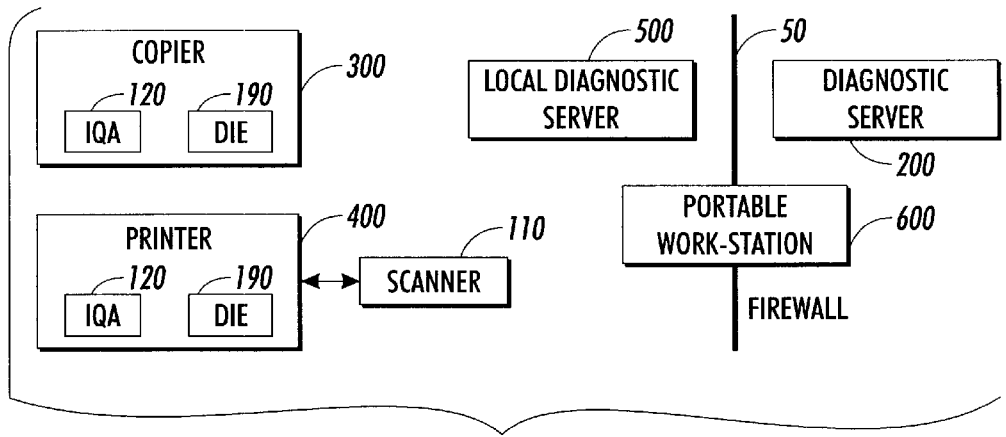
FIG. 2 is a functional block diagram showing a second embodiment of a diagnostic system according to this invention.

In particular, FIG. 2 illustrates an exemplary embodiment where most of the diagnostics are performed in the document processing system itself, however, the display and notification information can be communicated anywhere. For example, the copier 300 includes the image quality analysis circuit 120 and the diagnostic inference engine circuit 190. Additionally, the printer 400 comprises the image quality analysis circuit 120 and the diagnostic inference engine circuit 190. The printer 400 communicates with the scanner 110 to digitize one or more test patterns created by the printer 400. Where necessary to use an external scanner, the copier 300 may also communicate with the scanner 110. The local diagnostic server 500 is located on the copier 300 and printer 400 side of the firewall 50 while, in this exemplary embodiment, the diagnostic server 700 is located on the opposite side of the firewall 50, and the portable work station 600 may be on either side of the firewall 50.

Figure 3:
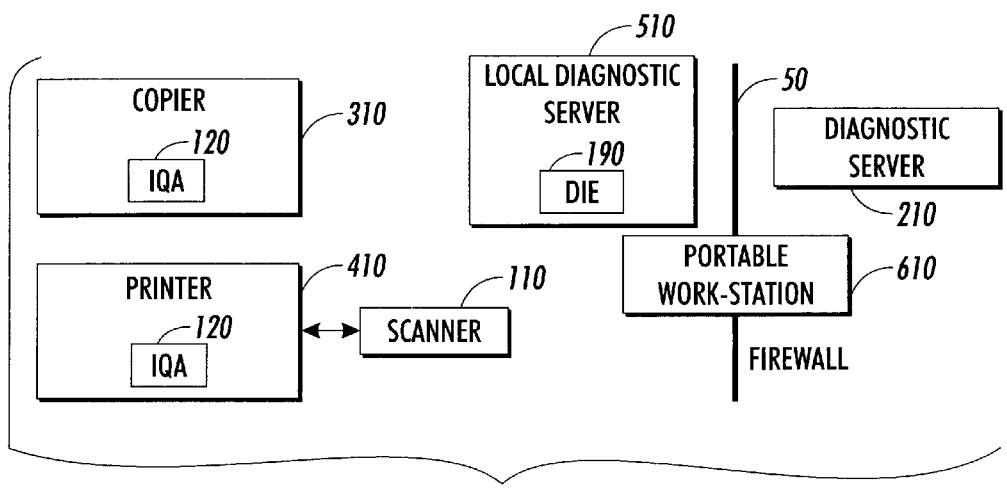
FIG. 3 is a functional block diagram showing a third embodiment of a diagnostic system according to this invention.

FIG. 3 illustrates a second exemplary embodiment where the diagnostic computation is carried out on a local diagnostic server at, for example, the customer site. In this case, the image quality analysis circuit 120 is located in the copier 310 or in the printer 410, which is connected to the scanner 110, and the diagnostic inference engine circuit 190 is located within the local diagnostic server 510. By having the image quality analysis circuit 120 located on the printer/copier, the scanned image data, which may be of high bandwidth, does not need to be transported across the customer's network. Therefore, the remainder of the information needed by the diagnostic engine, i.e., all the relevant machine data, should be transmitted to the local server, either in real-time, or stored in memory, such as the memory 160, and then transmitted to the server. As in the case of FIG. 2, the copier 310 may also communicate with the scanner 110 where it is necessary to use an external scanner. The local diagnostic server 510 is located on the copier 310 and printer 410 side of the firewall 50 while, in this exemplary embodiment, the diagnostic server 710 is located on the opposite side of the firewall 50, and the portable work station 610 may be on either side of the firewall 50.

Figure 4:
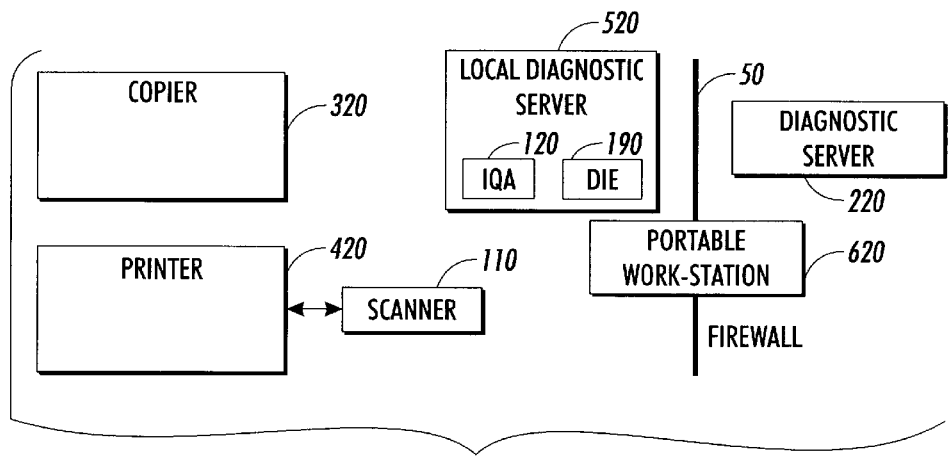
FIG. 4 is a functional block diagram showing a fourth embodiment of a diagnostic system according to this invention.

In FIG. 4, the local diagnostic server houses the image quality analysis circuit 120 and the diagnostic inference engine circuit 190. In this case, the scanner 110 is connected directly to the local diagnostic server 520. In this instance, the copier 320 and printer 420 do not house any of the diagnostic algorithms. Again, the copier 320 may be connected to an external scanner 110, if necessary. The local diagnostic server 520 is located on the copier 320 and printer 420 side of the firewall 50 while, in this exemplary embodiment, the diagnostic server 720 is located on the opposite side of the firewall 50, and the portable work station 620 may be on either side of the firewall 50.

Figure 5:
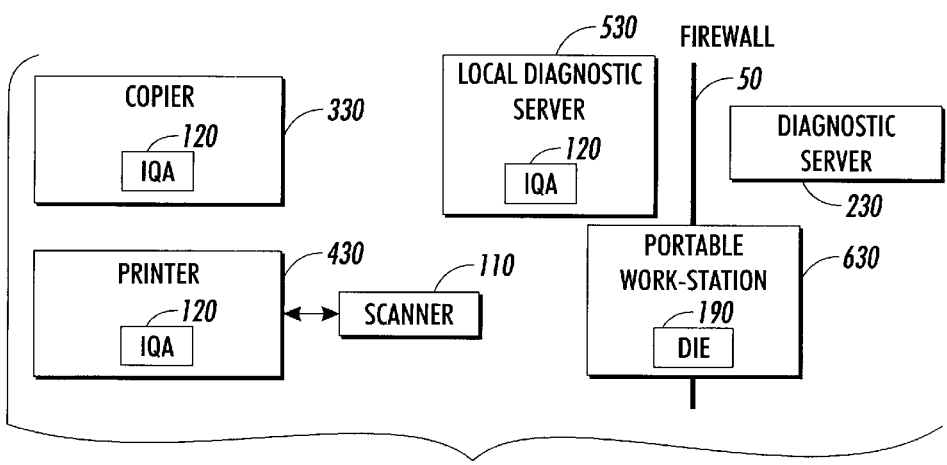
FIG. 5 is a functional block diagram showing a fifth embodiment of a diagnostic system according to this invention.

FIG. 5 illustrates another exemplary embodiment in which the diagnostic inference engine circuit 190 is located in the portable workstation 630, that could be on either side of the firewall 50. The copier 330 and the printer 430, which additionally are, or can be connected to the scanner, comprise the image quality analysis circuit 120. Alternately, the image quality analysis circuit 120 may reside in the local diagnostic server 530. The local diagnostic server 530 is located on the copier 330 and printer 430 side of the firewall 50 while, in this exemplary embodiment, the diagnostic server 730 is located on the opposite side of the firewall 50, and the portable work station 630 may be on either side of the firewall 50.

Figure 6:
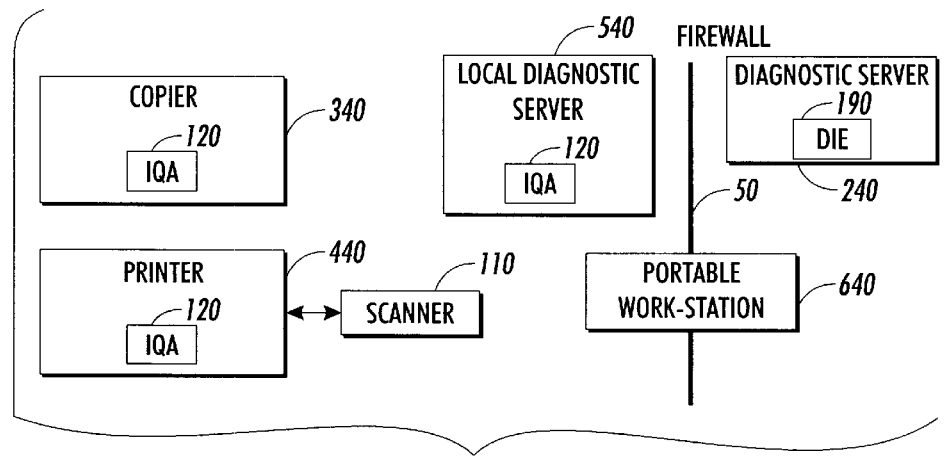
FIG. 6 is a functional block diagram showing a sixth embodiment of a diagnostic system according to this invention.

FIG. 6 illustrates another exemplary embodiment where the image quality analysis is on the document processing system or on the local server, and the diagnostic inference engine is part of a diagnostic server located on the opposite side of the firewall 50. In particular, the copier 340 includes an image quality analysis circuit 120, and the printer 440 includes the image quality analysis circuit 120. The printer, and optionally the copier, are connected to the scanner 10. The local diagnostic server 540 includes an image quality analysis circuit 120, and the diagnostic server 740 includes a diagnostic inference engine circuit 190. While in this particular embodiment, the image quality analysis circuit is located on the document processing system or on the local server, it can be appreciated that the circuit can also reside on the diagnostic server along with the diagnostic inference engine. As with the above described embodiments, the portable workstation 640 can be on either side of the firewall 50, but in this case, does not include the diagnostic inference engine.

Figure 7:
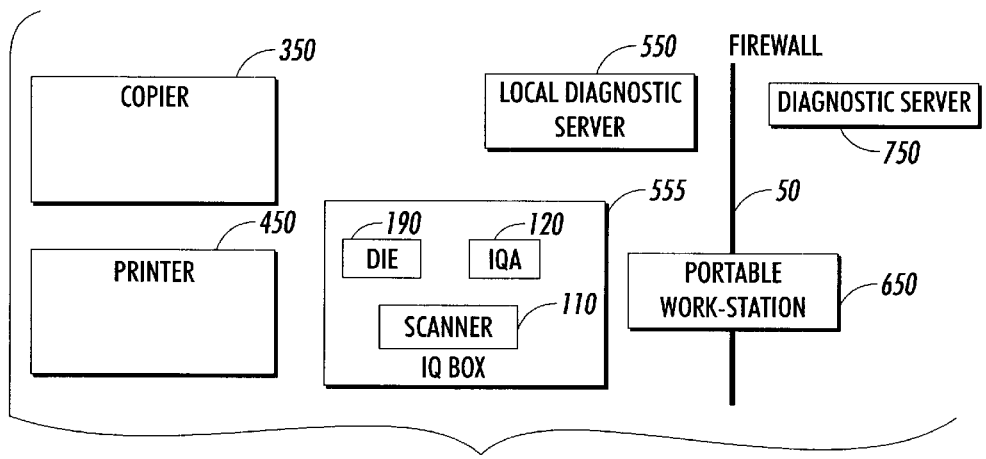
FIG. 7 is a functional block diagram showing a seventh embodiment of a diagnostic system according to this invention.

FIG. 7 illustrate an exemplary embodiment where both the image quality analysis circuit and the diagnostic inference engine can be implemented in a separate "image quality diagnostic tester." This image quality diagnostic tester may also include an scanner. The diagnostic tester can be connected to the document processing system via a local connection medium, such as a serial link, the ethernet or any other well known or later developed wired or wireless link. Additionally, the diagnostic tester can be connected to the portable workstation 650 and/or the diagnostic server 750 outside the firewall 50. In particular, this embodiment includes copier 350, printer 450, the diagnostic tester 555, which includes the diagnostic inference engine circuit 190, the image analysis circuit 120, scanner 110, and, optionally, a local diagnostic server 550, the firewall 50 and the diagnostic server 750.

Figure 8:
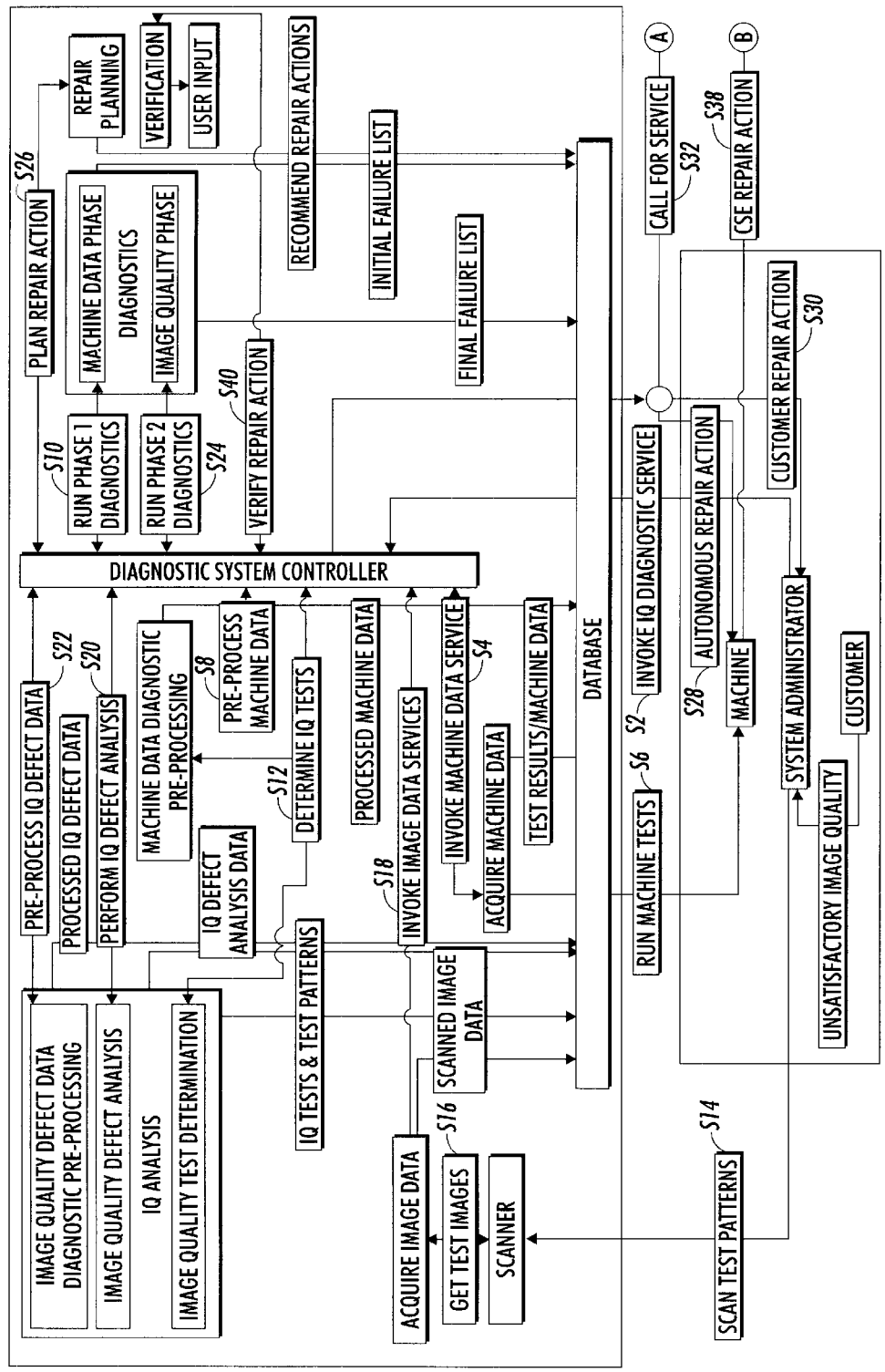
FIG. 8 is a workflow diagram illustrating an exemplary system workflow according to this invention.
Figure 9:
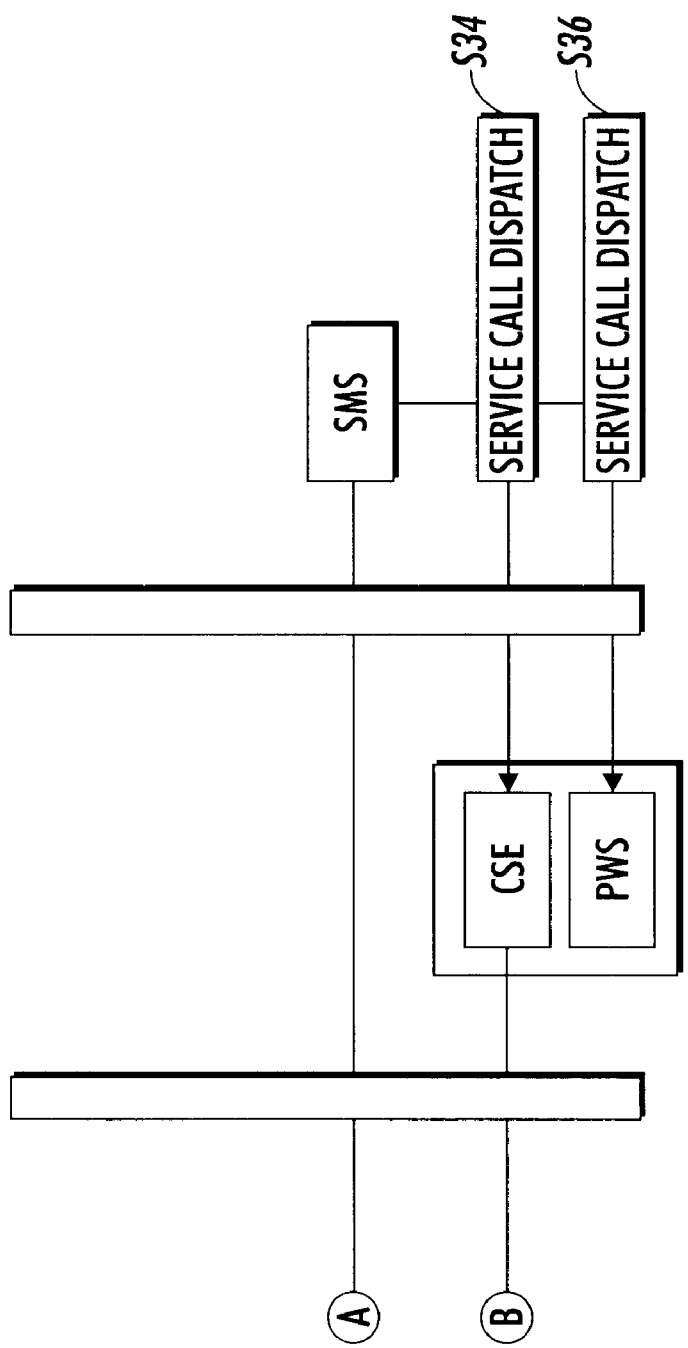
FIG. 9 is a continuation of the workflow diagram of FIG. 8.

FIGS. 8 and 9 illustrate an exemplary workflow diagram showing data flow between the various components of the diagnostic/prognostic system. In particular, control begins in step S1 where unsatisfactory image quality has been detected. Next, in step S2, the image quality diagnosis is invoked. Then, in step S4, the machine data service is invoked to acquire machine data as well as optionally perform additional tests to derive additional machine data.

In step S6, the machine tests are run. Next, in step S8, the acquired data is preprocessed and stored in a database. Then, in step S10, the first phase diagnosis is run on the machine data and an initial diagnosis/prognosis is obtained. Then, in step S12, a determination is made as to which image quality tests should be performed and which test patterns are to be scanned. In step S14 the determined test patterns are retrieved, printed and scanned. The scanned images are then acquired in step S16. Then, in step S20, the scanned image data is forwarded to the image quality analysis circuit for image quality analysis and defect recognition.

In step S22, the results of the image quality analysis, i.e, the image quality defect data and the image quality parameter data, are preprocessed. Next, in step S24, the phase 2 diagnosis/prognosis is run and the list of failures that have occurred, or are impending, are determined. Then, in step S26, the repair action is planned and recommended repair actions forwarded to the database in conjunction with all of the final and the intermediate results of the diagnostic/prognostic analysis. In addition, the scanned image data, the performed image quality tests and the test patterns used, may all be stored in the database.

In step S28, and depending on the recommended repair action, an autonomous repair sequence is initiated. The data pertaining to the automated repair action, such as, for example, the setpoint changes, are written to the database. Alternatively, in step S30, where a customer repair action is recommended, the necessary or appropriate information is sent to the customer. Next, the customer repairs the machine. Alternatively again, in step S32, a call for service is made based on the recommended repair action. This includes forwarding the call to a service monitoring system which dispatches a service call in step S34 to a customer service engineer and/or forwards a service call in step S36 to a portable workstation. Then, in step S38, the customer service engineer repairs the machine. In step S40, the repair action and the satisfactory operation of the machine are verified and the diagnostics/prognostics sequence ends.

Figure 10:
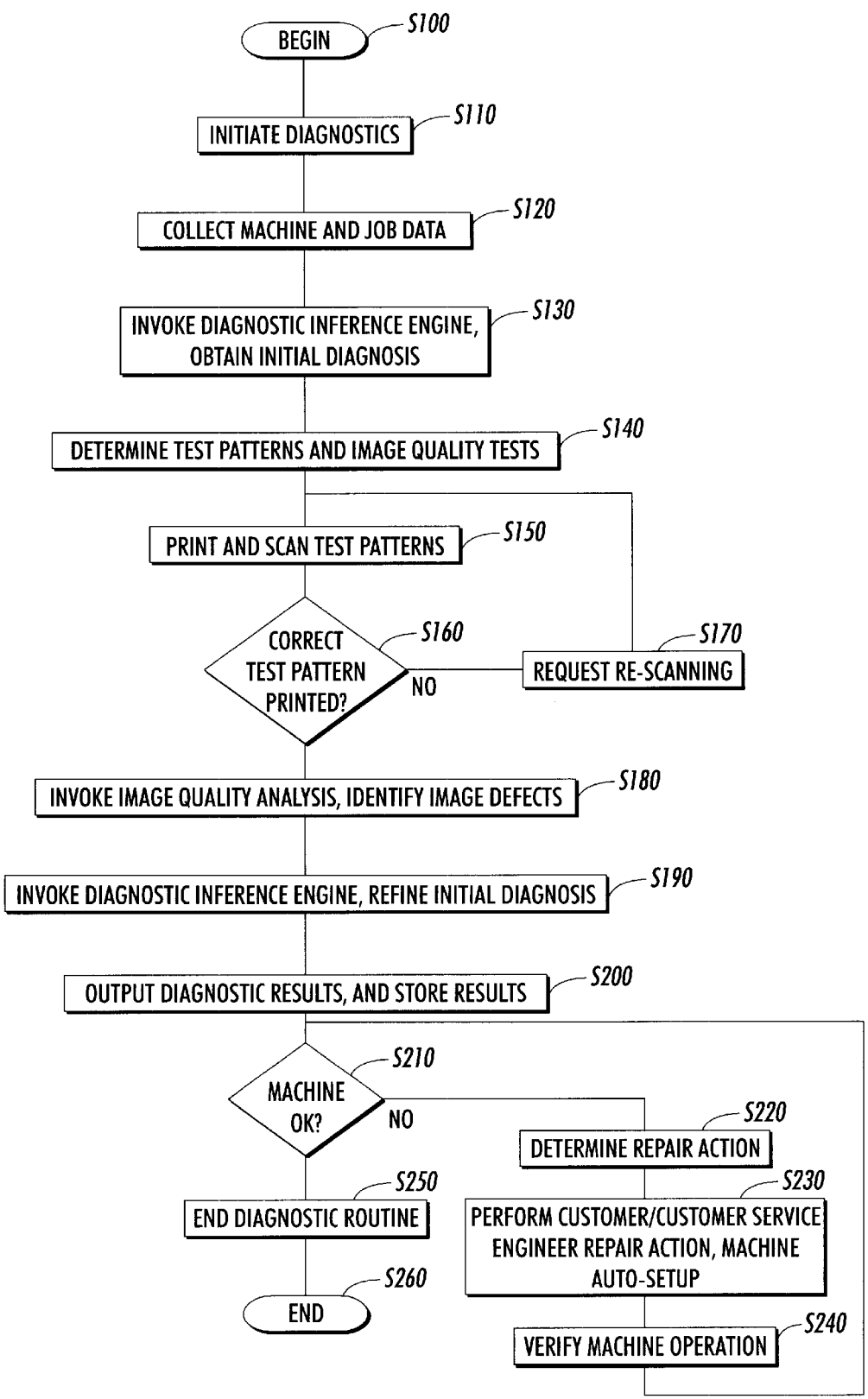
FIG. 10 is a flowchart outlining one exemplary embodiment of a method for diagnosing system faults in accordance with this invention.

FIG. 10 illustrates an exemplary embodiment of one method for diagnosing/predicting document processing system failures in accordance with this invention. Control begins in step S100 and continues to step S110. In step S110, the diagnostic routine is initiated. Next, in step S120, machine data and job data are collected and stored. Then, in step S130, the diagnostic inference engine operates on one or more of the machine and job data to obtain an initial diagnostics. Control then continues to step S140.

In step 140, the test patterns and the corresponding image quality analysis tests to be performed are determined. Next, in step 150, test patterns are printed and scanned. Then, in step S160, a determination is made as to whether the correct test patterns have been scanned, and whether they have been scanned in the correct sequence. If the correct test patterns have not scanned, control continues to step S170 where the user is requested to scan the prints correctly. Control then returns to step S150. Otherwise, control jumps to step S180.

In step S180, the image quality analysis is initiated to identify image defects. Next, in step S190, the diagnostic inference engine refines this initial diagnosis based on one or more of the found image defects and the machine and job data. Then, in step S200, the results of the diagnosis are output and/or stored. Control then continues to step S210.

In step S210, a determination is made whether the machine is operating correctly. If machine failures were found to have occurred, control continues to step S220. In steps S220 and S230, the appropriate repair action is determined and one or more of a customer, a customer service engineer, or an automatic machine repair action are commenced. Then, in step S240, the operation of the machine is verified. Control then returns to step S210.

Otherwise, control jumps to step S250 where the diagnostic routine ends. Control then continues to step S260 where the control sequence ends.

As shown in FIGS. 1–9, the diagnostic system is preferably implemented either on a single program general purpose computer or separate program general purpose computer. However, the diagnostic system can also be implemented on a special purpose computer, a programmed microprocessor or microcontroller and peripheral integrated circuit element, an ASIC, or other integrated circuit, a digital signal processor, a hard-wired electronic or logic circuit such as a discreet element circuit, a programmable logic device such as a PLD, PLA, FPGA, PAL, or the like. In general, any device capable of implementing a finite state machine that is in turn capable of implementing the a flowcharts shown in FIGS. 8–10 can be used to implement the diagnostic system.

Furthermore, the disclosed method may be readily implemented in software using object or object-oriented software development environments that provide portable source code that can be used on a variety of computer, workstation and/or personal digital assistant hardware platforms. Alternatively, the disclosed diagnostic system may be implemented partially or fully in a hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The diagnostic systems and methods described above, however, can also be readily implemented in hardware or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as a Java® or CGI script, as a resource residing on a server or graphics workstation, as a routine embedded in a diagnostic system, personal digital assistant interface, dedicated handheld device, or the like. The diagnostic system can also be implemented by physically incorporating the system and method into a software and/or a hardware system, such as the hardware and software systems of a workstation or dedicated diagnostic system.

It is, therefore, apparent that there has been provided, in accordance with the present invention, systems and methods for an automated image quality based diagnostic system for document processing systems. While this invention has been described in conjunction with preferred embodiments thereof, it is evident that many alternatives, modifications and variations be apparent to those skilled in the art. Accordingly, Applicants intend to embrace all such alternatives, modifications and variations that follow in the spirit and scope of this invention.

What is claimed is:

1. A system for automated image quality based prognostics, diagnostics and remediation of at least one document processing system, comprising:
    a data acquisition and diagnostic processing circuit that collects and processes data;
    a diagnostic inference engine circuit that analyzes the data to obtain an initial diagnosis, the initial diagnosis including a list of potential defects in data corresponding to at least one image; and
    an image quality analysis circuit that identifies at least one defect in the data corresponding to at least one image based on the list of potential defects, wherein the diagnostic inference engine circuit refines the initial diagnosis based on the at least one identified defect.

2. The system of claim 1, further comprising at least one sensor that supplies the at least one machine data to the diagnostic inference engine circuit.

3. The system of claim 1, further comprising at least one virtual sensor that supplies the at least one machine data to the diagnostic inference engine circuit.

4. The system of claim 1, further comprising at least one user interface that communicates a diagnostic result determined by the diagnostic inference engine circuit.

5. The system of claim 1, wherein a repair planning circuit determines a repair action based on the refined initial diagnosis.

6. The system of claim 5, wherein the repair planning circuit communicates at least one of repair information to at least one customer, a parts request to an appropriate entity, a service request notification to a customer service engineer and an instruction to autonomous repair entity.

7. The system of claim 1, wherein the diagnostic inference engine circuit analysis is based on at least one of a threshold analysis, a statistical analysis, a signature analysis, a trend analysis, a timing analysis, an event sequence analysis, a pattern analysis, an image processing technique, a quantitative and a qualitative state estimation technique, a model based diagnostic technology, a look-up table, a neural network based analysis, a fuzzy logic based analysis, a bayesian network, a causal network, a rule based system analysis and an expert system.

8. The system of claim 1, wherein the data is at least one of component level data, system level data, event level data, job level data, control data, diagnostic data, environmental data, machine usage data, machine configuration data, single-machine value-added diagnostic data and population diagnostic data.

9. The system of claim 1, wherein one or more of the data and a fleet-wide population statistic data is obtained from at least one of a knowledge server database and a memory.

10. The system of claim 1, further comprising:
an image determination circuit that identifies an image to print; and
a printer that produces the at least one image.

11. The system of claim 1, further comprising:
a scanner that digitizes the at least one image; and
an image recognition circuit that verifies the identity of the at least one image.

12. The system of claim 1, further comprising an autonomous repair circuit that controls an autonomous repair.

13. The system of claim 12, wherein the autonomous repair circuit establishes a communication with the at least one document processing system, the communication including at least one of transferring monitoring information, interrogation information, control information, repair information and results of the refined initial diagnosis.

14. The system of claim 1, further comprising at least one controller that supplies the at least one machine data to the diagnostic inference engine circuit.

15. A method for automated image quality based prognostics, diagnostics and remediation of at least one document processing system, comprising:
obtaining data pertaining to the at least one document processing system;
analyzing the data to obtain an initial diagnosis, the initial diagnosis including a list of potential defects in data corresponding to at least one image;
generating at least one image;
performing an image quality analysis of the data corresponding to the at least one image based on the list of potential defects; and
refining the initial diagnosis based on results of the image quality analysis.

16. The method of claim 15, further comprising determining a repair action based on the refined initial diagnosis.

17. The method of claim 15, further comprising forwarding at least one of repair information to at least one customer, a parts request to an appropriate entity, a service request notification to a customer service engineer and an instruction to autonomous repair entity.

18. The method of claim 15, wherein the initial diagnosis and the refined diagnosis are based on at least one of a threshold analysis, a statistical analysis, a signature analysis, a trend analysis, a timing analysis, an event sequence analysis, a pattern analysis, an image processing technique, a quantitative and a qualitative state estimation technique, a model based diagnostic technology, a look-up table, a neural network based analysis, a fuzzy logic based analysis, a bayesian network, a causal network, a rule based system analysis and an expert system.

19. The method of claim 15, wherein the data is at least one of component level data, system level data, event level data, job level data, control data, diagnostic data, environmental data, machine usage data, machine configuration data, single-machine value-added diagnostic data and population diagnostic data.

20. The method of claim 15, wherein one or more of the data and a fleet-wide population statistic is obtained from at least one of a knowledge server database and a memory.

21. The method of claim 15, further comprising:
determining the at least one image to print; and
printing the at least one image.

22. The method of claim 15, further comprising:
scanning the at least one image; and
verifying the identity of the at least one image.

23. The method of claim 15, further comprising verifying the at least one document processing system's operation after completion of a repair.

24. The method of claim 15, wherein the image quality analysis detects at least one image defect including lines, bands, streaks, spots, mottle, halo, splatter, light images, dark images, blank images, deletions, background ink contamination, graininess, ghosting, skew, registration defects, color balance, color registration, color variation within a page, print-to-print variation, inboard-outboard variation, loss of a tone-reproduction, line width, edge width, line density, line edge, line shape, sharpness, contours, reload and pixel-to-pixel placement defects.

25. The method of claim 15, wherein the image quality analysis is based on at least one of Fourier transform analysis, histogramming, edge detection, 1-D projections, segmentation, classification, artifact detection, FIR filtering, morphological analysis, wavelet analysis and statistical analysis pattern recognition techniques and neural networks.

26. The method of claim 15, further comprising initialing an autonomous repair.

27. The method of claim 26, wherein initializing the autonomous repair includes establishing a communication with the at least one document processing system, the communication including at least one of transferring monitoring information, interrogation information, control information, repair information and results of the refined initial diagnosis.

28. An information storage medium that stores a program, executable on a processing device, for automated image quality based prognostics, diagnostics and remediation of at least one document processing system, comprising:
instructions for obtaining data pertaining to the at least one document processing system;
instructions for analyzing the data to obtain an initial diagnosis, the initial diagnosis including a list of potential defects in data corresponding to at least one image;
instructions for generating at least one image;
instructions for performing an image quality analysis of the data corresponding to the at least one image based on the list of potential defects; and
instructions for refining the initial diagnosis based on results of the image quality analysis.

29. The information storage medium of claim 28, further comprising instructions for determining a repair action based on the refined initial diagnosis.

30. The information storage medium of claim 28, further comprising instructions for forwarding at least one of repair information to at least one customer, a parts request to an appropriate entity, a service request notification to a customer service engineer and an instruction to an autonomous repair entity.

31. The information storage medium of claim 28, wherein the initial diagnosis and the refined diagnosis are based on at least one of a threshold analysis, a statistical analysis, a signature analysis, a trend analysis, a timing analysis, an event sequence analysis, a pattern analysis, an image processing technique, a quantitative and a qualitative state estimation technique, a model based diagnostic technology, a look-up table, a neural network based analysis, a fuzzy logic based analysis, a bayesian network, a causal network, a rule based system analysis and an expert system.

32. The information storage medium of claim 28, wherein the data is at least one of component level data, system level data, event level data, job level data, control data, diagnostic data, environmental data, machine usage data, machine configuration data, single-machine value-added diagnostic data and population diagnostic data.

33. The information storage medium of claim 28, wherein one or more of the data and a fleet-wide population statistic is obtained from at least one of a knowledge server database and a memory.

34. The information storage medium of claim 28, further comprising:
   instructions for determining the at least one image to print; and
   instructions for printing a hard copy of the at least one image.

35. The information storage medium of claim 28, further comprising:
   instructions for scanning the at least one image; and
   instructions for verifying the identity of the at least one image.

36. The information storage medium of claim 28, further comprising instructions for verifying the at least one document processing system's operation after completion of a repair.

37. The information storage medium of claim 28, wherein the image quality analysis detects at least one image defect including lines, bands, streaks, spots, mottle, halo, splatter, light images, dark images, blank images, deletions, background ink contamination, graininess, ghosting, skew, registration defects, color balance, color registration, color variation within a page, print-to-print variation, inboard-outboard variation, loss of a tone-reproduction, line width, edge width, line density, line edge, line shape, sharpness, contours, reload and pixel-to-pixel placement defects.

38. The information storage medium of claim 28, wherein the image quality analysis is based on at least one of Fourier transform analysis, histogramming, edge detection, 1-D projections, segmentation, classification, artifact detection, FIR filtering, morphological analysis, wavelet analysis and statistical analysis pattern recognition techniques and neural networks.

39. The information storage medium of claim 28, further comprising instructions for initializing an autonomous repair.

40. The information storage medium of claim 39, wherein initializing the autonomous repair includes establishing a communication with the at least one document processing system, the communication including at least one of transferring monitoring information, interrogation information, control information, repair information and results of the refined initial diagnosis.

* * * * *